Feb. 14, 1956 G. E. KAUFMAN 2,734,219
HANDLE AND NOZZLE CONTROLS FOR SUCTION CLEANERS
Filed Sept. 29, 1950 4 Sheets-Sheet 1

INVENTOR.
George E. Kaufman
BY
Harry Si Dumass
ATTORNEY.

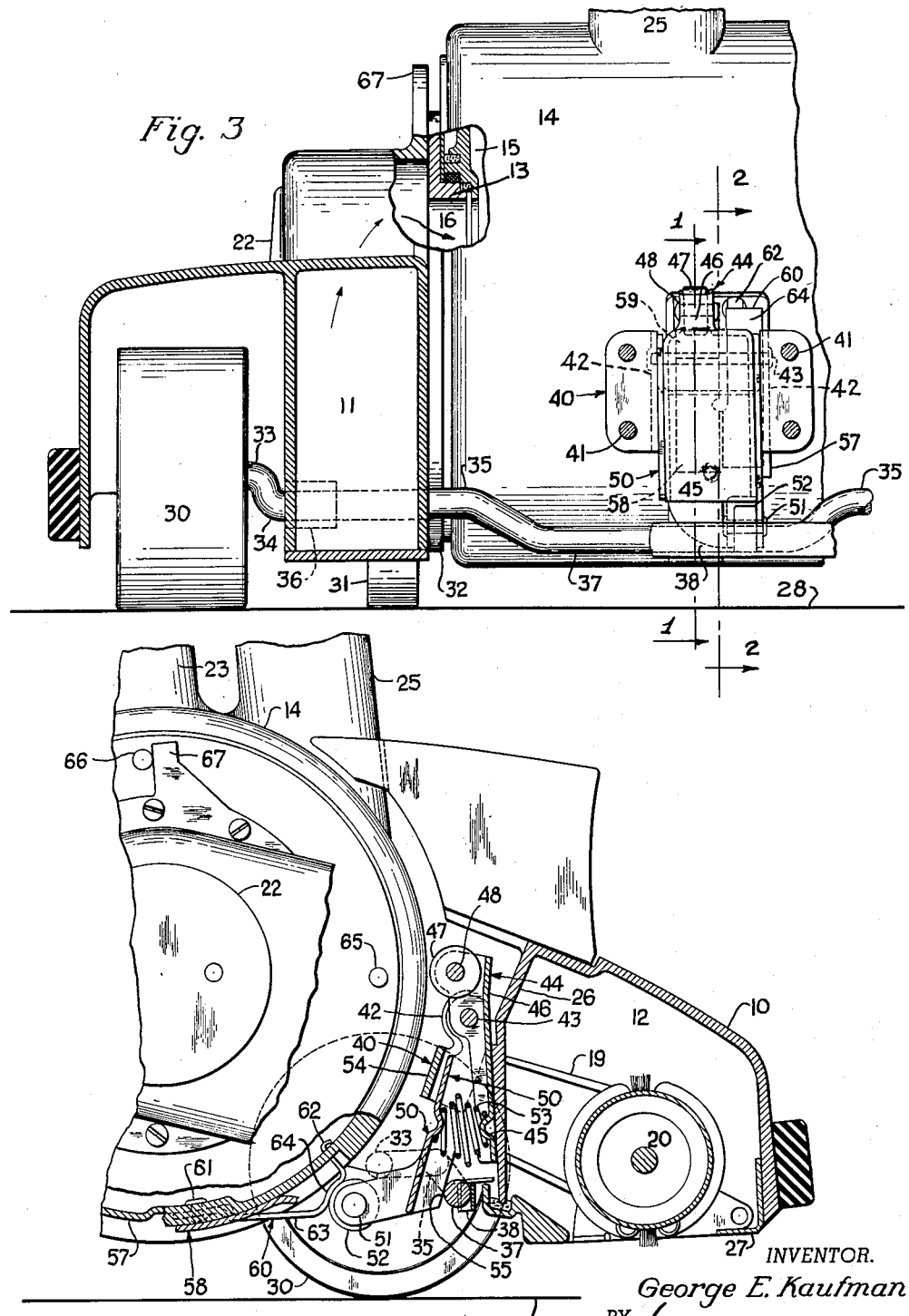

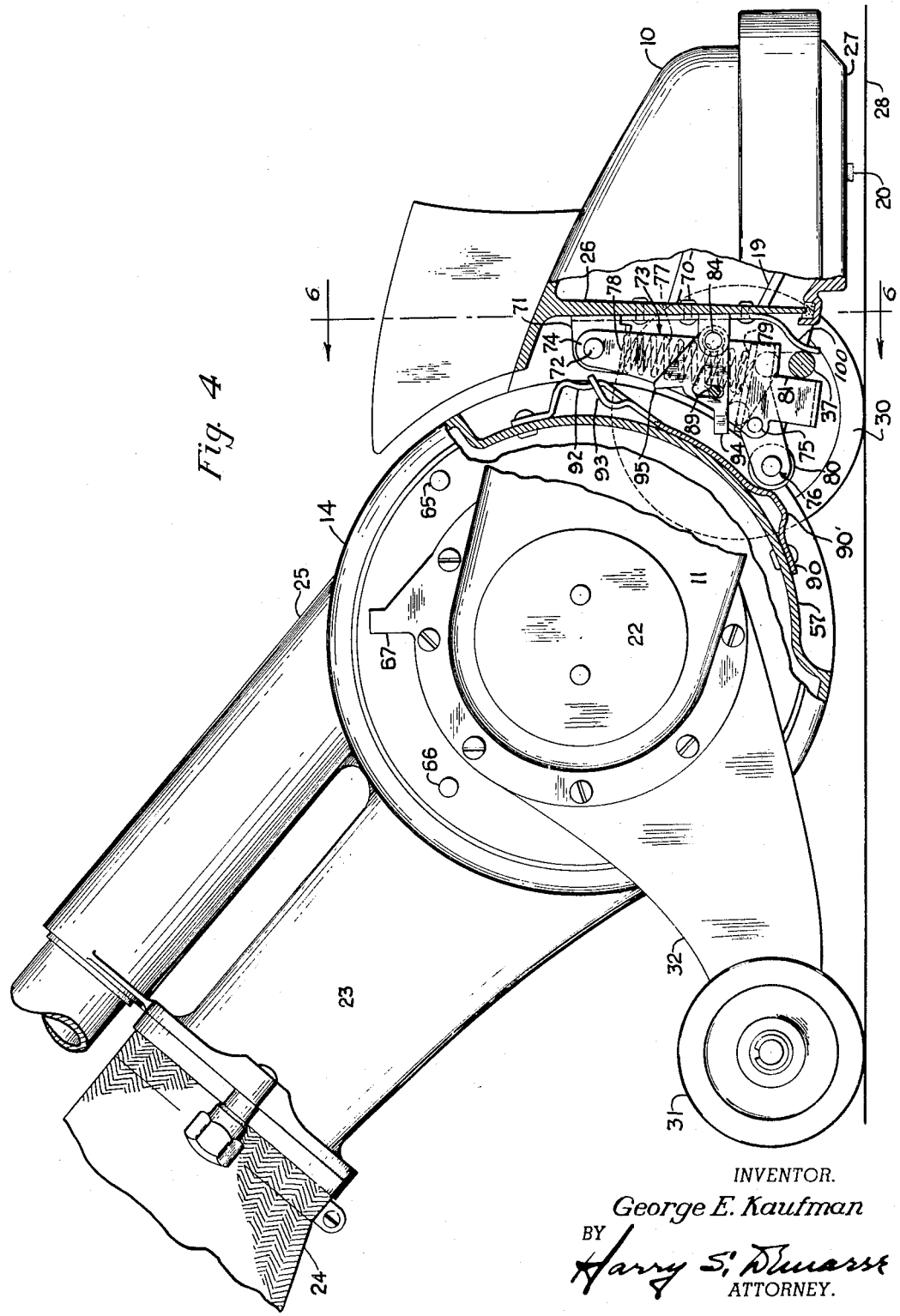

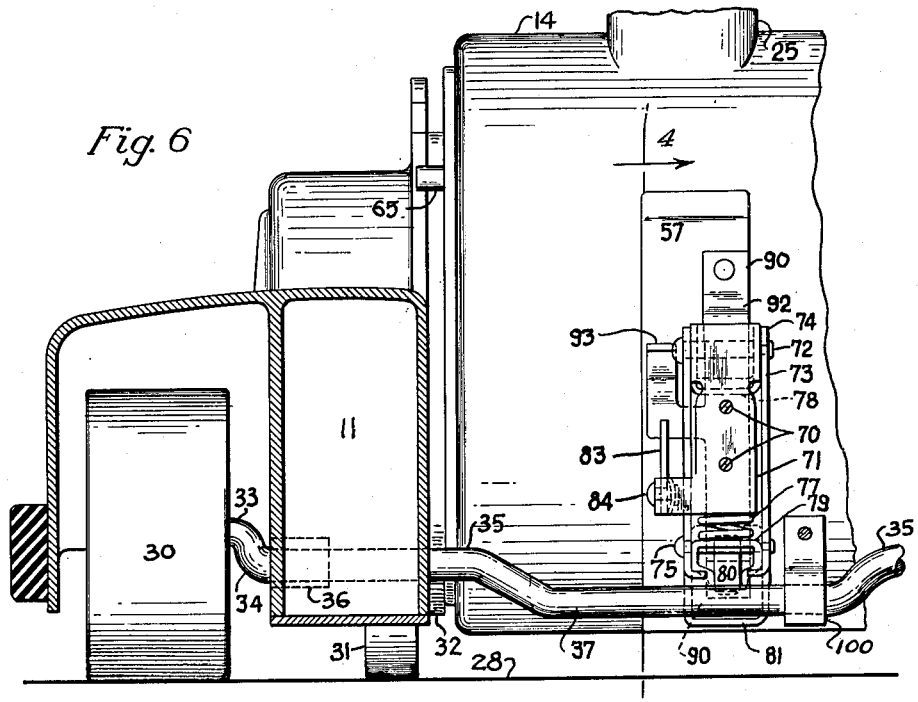

United States Patent Office 2,734,219
Patented Feb. 14, 1956

2,734,219

HANDLE AND NOZZLE CONTROLS FOR SUCTION CLEANERS

George E. Kaufman, Canton, Ohio, assignor to The Hoover Company, North Canton, Ohio, a corporation of Ohio Application September 29, 1950, Serial No. 187,455

4 Claims. (Cl. 15—361)

The present invention relates to suction cleaners and more particularly to a nozzle and handle control for a suction cleaner.

An object of the invention is to provide a control to strongly resist movement of the propelling handle into its different operating ranges in comparison to the resistance in moving the handle into a position to adjust the nozzle. A further object is to provide single resilient means acting on a pair of lever means for effecting relatively stronger resistance to movement of the handle into different operating ranges than the resistance to movement of the handle to a position to adjust the nozzle. Another object is to provide a suction cleaner having means to adjust the nozzle and also maintain the handle in one of its positions. A further object is to provide a simple device for controlling the handle positions and adjustments of the nozzle. Other objects and advantages of the invention will be apparent from the following descriptions and drawings, wherein:

Figure 2 is a similar view taken along the line 2—2 of Figure 3 but showing the handle in storage position and the nozzle raised from the supporting surface;

Figure 3 is a front view of the nozzle and handle control device taken along the line 3—3 of Figure 1;

Figure 4 is a side elevation, partly in section along line 4—4 of Figure 6, of another embodiment of the invention showing the handle at the lower end of the normal operating range;

Figure 5 is a similar view with the handle in storage position and the nozzle raised from the supporting surface; and Figure 6 is a front view of the nozzle and handle control device shown in Figure 4 taken along line 6—6 of Figure 4.

Figure 1:
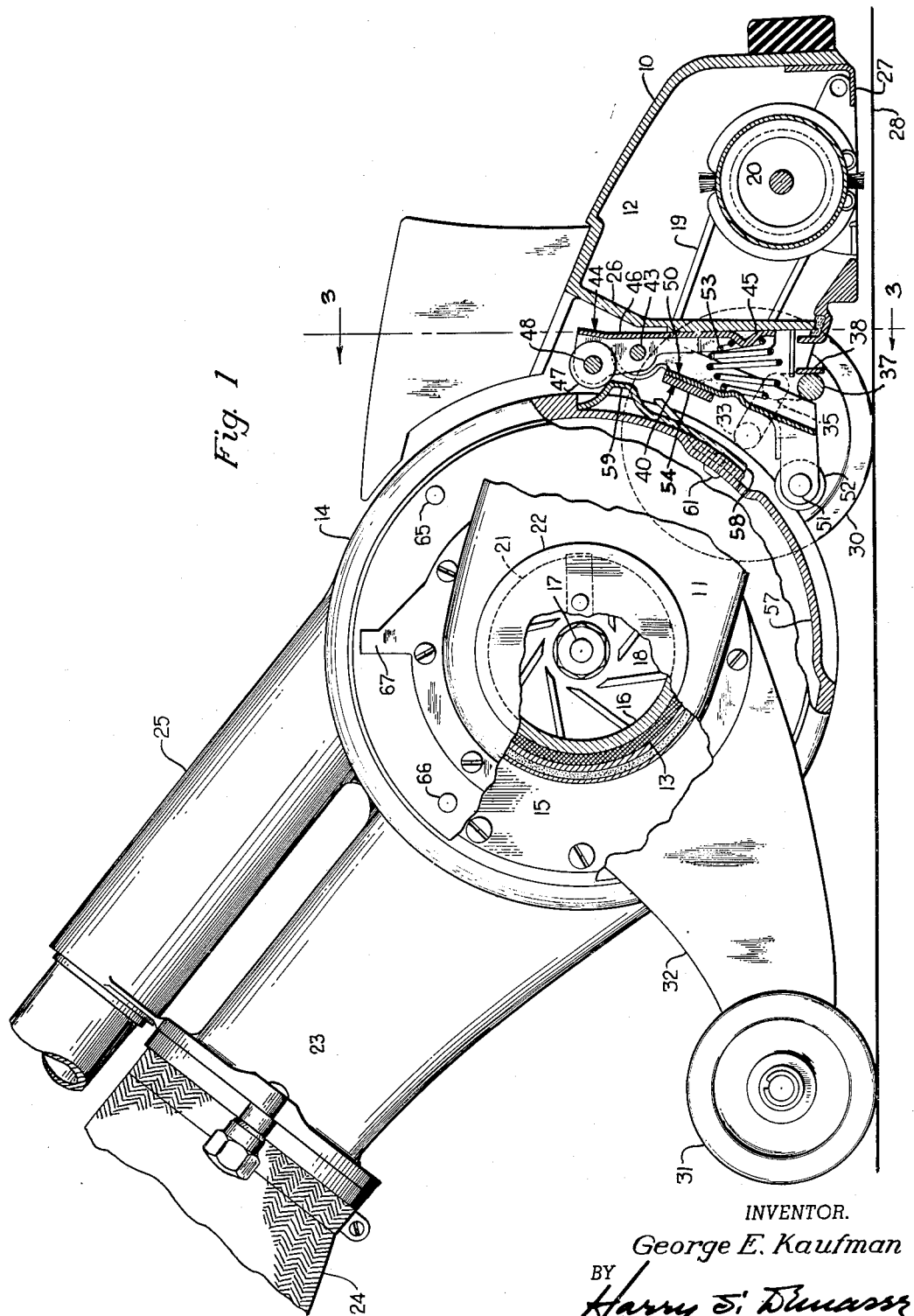
Figure 1 is a side elevation, partly in section, and viewed along the line 1—1 of Fig. 3, of one embodiment of the invention showing the handle maintained at the lower end of its normal operating range.

The embodiment of the invention disclosed in Figures 1 to 3 comprises a cleaner body provided with a nozzle 10 from the opposite ends of which extend a suction air passageway 11 and a belt conduit 12, only partially shown, each provided with a trunnion 13 on which is rotatably mounted a motor-fan housing 14 having a fan chamber 15 provided with an inlet 16. Disposed in the housing 14 is an unshown motor having a shaft 17 on which is mounted a fan 18 to create suction in the air passageway 11 and the nozzle 10. At the opposite end of the shaft 17 is an unshown pulley for a belt 19 extending to a surface agitating member 20 rotatably mounted in the nozzle 10. An opening 21 is provided in the air passageway 11 opposite the fan eye 16 for reception of an unshown converter when it is desired to employ the cleaner for off-the-floor cleaning, and the opening 21 is normally closed by a removable cover 22, as will be understood by those skilled in the art. Extending from the fan chamber 15 is an outlet 23 to which the lower end of a bag 24, only partly shown, is removably attached and the latter is supported at its upper end to a handle 25 mounted on the housing 14 for movement therewith. The nozzle 10 has a rear wall 26 and the agitator 20 projects through a perimeter lip 27 for operative engagement with the surface 28 to be cleaned.

The cleaner is supported on fronts wheels 30—30 and rear wheels 31—31, the latter being mounted on brackets 32—32 extending from the stationary portion of the body. The front wheels 30 are mounted on the rearwardly offset ends 33—33 of an eccentric shaft 34 having offset portions 35—35 rotatably attached to the cleaner body by brackets 36, and the mid-portion 37 of the shaft is offset downwardly of the cleaner. A spring 38 is mounted by unshown rivets to the nozzle rear wall 26 and exerts a force against the mid-portion 37 of the shaft 34 to urge the front wheels towards the cleaner body and maintain the nozzle in proper position with respect to the surface 28 being cleaned, as shown in Figure 1.

A bracket 40 is secured to the nozzle rear wall 26 by rivets 41 and its side walls 42 support a pin 43 on which is pivoted a handle control lever 44. The lever 44 has a long lever arm 45 and a short lever arm 46, the latter rotatably supporting a handle control roller 47 on a pin 48. Also rotatably mounted on the pin 43 is one end of a nozzle adjusting lever 50 provided at its lower end with a pin 51 supporting a roller 52 for nozzle adjustment and handle control. A spring 53 is disposed between the long lever arm 45 and the lever 50 to exert a force on both of the levers, and clockwise movement of the lever 50 is limited by the wall 54 of the bracket 40, while counterclockwise movement of the lever arm 45 is limited by the nozzle rear wall 26. The offset portion 37 of the wheel shaft 34 is urged by the spring 38 into engagement with the lever 50 as indicated at 55.

The housing 14 has a recessed arcuate wall 57 at one end of which is mounted a bracket 58 having a raised stop 59 which engages the handle control roller 47 as shown in Figure 1 to limit movement of the handle 25 at the lower end of its normal operating range. Disposed alongside the bracket 58 is a spring 60 secured at one end to the wall 57 by a rivet 61 and the opposite end extends through an opening in the wall and has a hooked portion 62 to limit outward movement of the spring. A ramp 63 and a recess 64 are provided on the spring 60, the recess 64 receiving the roller 52 to maintain the handle in storage position as shown in Figure 2. The bracket 58 and spring 60 are arranged to contact respectively the rollers 47 and 52 during movement of the handle to its different positions. Mounted on the housing 14 are two pins 65 and 66 which abut opposite faces of a lug 67 on the wheel bracket 32 to limit movement of the handle 25 to its horizontal and vertical positions. The normal operating range of the handle 25 is defined by movement of the raised stop 59 and spring 60 between the rollers 47 and 52, and the low working range is defined by movement of the handle 25 between the pin 65 abutting the lug 67 and the stop 59 engaging the top surface of the roller 47.

In operating the cleaner for on-the-floor cleaning, the suction created by the fan 18 and the rotating agitator 20 remove the dirt from the surface 28 being cleaned and the dirt is carried by the air stream through the passageway 11 into the fan chamber 15 and discharged into the bag 24. During movement of the cleaner over the surface 28, the handle 25 is maintained in its normal operating range by the stop 59 abutting the lower surface of the roller 47 or the spring 60 engaging the upper surface of the roller 52. If it is desired to move the handle 25 to its lower operating range, a downward force is exerted on the handle 25 to overcome the force of the spring 53 on the long lever arm 45 to thereby pivot the lever 44 clockwise to permit movement of the stop 59 past and above the roller 47. Thereafter the handle 25 is freely movable in its lower operating range defined by the stop 59 abutting the top of the roller 47 and the pin 65 engaging the lug 67. In order to again place the handle in its normal operating range, the operator lifts the handle upwardly to move the stop 59 below the roller 47.

The handle 25 is maintained in storage position and the nozzle raised to off-the-floor cleaning, as shown in Figure 2, by pivoting the handle upwardly to move the spring recess 64 into engagement with the roller 52. During movement of the handle 25 and motor-fan housing 14 from the position shown in Figure 1 to that in Figure 2, the stop 59 by-passes the roller 52 and the latter engages the ramp 63 on the spring 60. The ramp 63 pivots the lever 50 and front wheel shaft 34 counter-clockwise against the force of the spring 53 to raise the nozzle 10 from the surface 28, and the nozzle is maintained in its raised position when the roller 52 seats in the spring recess 64. When the roller 52 is seated in the spring recess 64, the handle 25 is also resiliently held in its vertical or storage position by the spring 53 exerting a force against the lever 50. The cover 22 can then be removed and a converter tool inserted through the opening 21 into the fan eye 16 to adapt the cleaner to off-the-floor cleaning.

Less force is required to move the handle 25 into its storage position than into its normal and low ranges of operation since the force exerted by the spring 53 against the lever 50 and thus the roller 52 is less than the force against the long lever arm 45 and thus the handle control roller 47. It is desirable that a relatively small effort be required to move the handle into its storage position because, if a great force is applied to the handle when it approaches the vertical position, the cleaner will be propelled forwardly along the surface 28.

The embodiment of the invention disclosed in Figures 4 to 6 is similar to that in Figures 1 to 3 with the exception of the handle control and nozzle adjusting mechanism.

Attached to the nozzle rear wall 26 by rivets 70 is a bracket 71 provided at its upper end with a pin 72 supporting one end of a U-shaped lever 73 between the walls 74—74 of which is a pivot pin 75 for detent lever 76. A spring 77 is supported between a seat 78 in the bracket 71 and upon one end 79 of the detent lever 76 to urge the latter in a clockwise direction. Mounted on the opposite end of the detent lever 76 is a roller 80. The offset portion 37 of the wheel shaft 34 is urged by a spring 100 mounted on the nozzle rear wall to at all times engage the lower portion 81 of the lever 73.

A latch 83 is pivotally supported on a pin 84 mounted on the bracket 71 and is provided with an angular slot 85 having portions 86 and 87 to receive a pin 89 attached to the lever 73. When the pin 89 is in the slot portion 86 the lever 73 is locked in position as viewed in Figure 4, and when in the slot portion 87 both the levers 73 and 76 are movable about their respective pivots 72 and 75.

The arcuate wall 57 in the motor-fan housing 14 is provided with a sector 90 having a raised stop 90' which engages the lower surface of the roll 80, as shown in Figure 4, to limit movement of the handle 25 at the lower end of its normal operating range. Spaced from the stop 90' is a ramp 91 terminating in a recessed stop 92 which receives the roller 80 to maintain the handle in storage position as shown in Figure 5. Adjacent the ramp 91 is a tab 93 which engages the ears 94 and 95 on the latch 83 to position the latter during movement of the handle into and out of its storage position.

The normal operating range of the handle 25 is defined by movement of the point 96 and the raised stop 90' with respect to the roller 80, and the lower operating range is defined by the pin 65 abutting the lug 67 and the raised stop 90' engaging the upper surface of the roller 80.

In operating the cleaner, if the handle 25 and the motor-fan housing 14 is at the lower end of the normal operating range, as viewed in Figure 4, and it is desired to move the handle into its lowest range, a downward force is applied on the handle to overcome the force of the spring 77 on the detent lever 76 to pivot the latter counter-clockwise about the pin 75 for movement of the raised stop 90' past and above the roller 80. Thereafter the handle is freely movable in its lowest operating range defined by the raised stop 90' engaging the upper surface of the roller 80 and the pin 65 abutting the lug 67.

Movement of the handle into and out of its normal operating range is opposed by the spring 77 exerting its force through the lever 76 against the raised stop 90', and during such handle movement the lever 73 is held stationary by the pin 89 engaging the slot portion 86 of the latch 83. Movement of the spring 77 about its upper seat 78 is also prevented, and thus the full force of the spring 77 must be overcome to move the handle into its different ranges of operation.

Movement of the handle 25 and the motor-fan housing 14 from the position in Figure 4 to its vertical or storage position in Figure 5 is accomplished by lifting the handle which causes the tab 93 to be rotated clockwise into engagement with the ear 94 of the latch 83 to pivot the latter downwardly and arrange the locking pin 89 in the slot portion 87 to thereby unlock the lever 73 and permit movement of the latter about its pivot 72 and the spring 77 about its upper seat 78. Thereafter the ramp 91 engages the roller 80 to pivot the lever 76 counter-clockwise about the pin 75 and the lever 73 about its pin 72, and such movement of the lever 73 also moves the spring seat 79 and the lever 76 towards the nozzle rear wall 26, whereby the force applied by the spring 77 in opposing handle movement is less than when the lever 73 is locked for movement of the handle stop 90' past the roller 80 into different handle positions.

Movement of the lever 73 towards the nozzle rear wall 26 rotates the wheel shaft 34 counter-clockwise to lower the front wheels 30 and raise the nozzle 10 from the surface 28 to the position shown in Figure 5. When the roller 80 is seated in the stop recess 92, the handle 25 is held in storage position and the nozzle 10 in raised position by the force exerted through the spring 77 on the pivotable levers 73 and 76. The cover 22 can then be removed for inserting a converter in the fan eye 16 to adapt the cleaner for off-the-floor cleaning.

Upon moving the handle 25 downwardly from its storage position, as shown in Figure 5, to the handle normal operating range in Figure 4, the tab 93 engages the ear 95 to pivot the latch 83 clockwise and move the slot portion 86 into engagement with the pin 89 to lock the latch 83 and thus the lever 73 to permit the spring 77 to exert a great force on the lever 76 and thereby strongly resist handle movement of the raised stop 90' past the roller 80 into the lower operating range. Movement of the handle out of its storage position also lowers the nozzle 10 to its normal operating height relative to the surface 28 as shown in Figure 4.

While I have shown and described but two embodiments of my invention it is to be understood that those embodiments are to be taken as illustrative only and not in a limiting sense. I do not wish to be limited to the particular structure shown and described but to include all equivalent variations thereof except as limited by the scope of the claims.

I claim:

1. In a suction cleaner, a body having a nozzle for cleaning a surface, a handle mounted on said body for movement through different operating ranges, handle control means on said body and handle for controlling the range of movement of the latter, nozzle height adjusting means on said body and handle and actuated upon movement of the latter to one position to adjust said nozzle with respect to the surface, and single resilient means so arranged with respect to said handle control means and said nozzle adjusting means to exert a greater resisting force against said handle control means during movement of said handle into different ranges and a lesser resisting force against said nozzle adjusting means during adjustment of said nozzle by said handle movement.

2. In a suction cleaner, a body having a nozzle for cleaning a surface, a handle mounted on said body for movement to different positions, nozzle supporting means movably mounted on said body, a pair of levers mounted on said body, one of said levers operatively connected to said supporting means, means on said handle engageable with said one lever to shift said supporting means and adjust the height of said nozzle upon movement of said handle to one position, means on said handle engageable with the other lever to maintain said handle in another position, and single resilient means interposed between said two levers for yieldably resisting movement of said levers in movement of said handle to its different positions.

3. In a suction cleaner, a body having a nozzle for cleaning a surface, a handle mounted on said body for movement to different positions, nozzle supporting means movably mounted on said body, a first and second lever mounted side-by-side on said body, said first lever operatively engaging said nozzle supporting means, first means mounted on said handle to by-pass said second lever for engagement with said first lever to shift said supporting means and adjust said nozzle upon movement of said handle to one position, and second means mounted on said handle to by-pass said first lever for engagement with said second lever to maintain said handle in another position, and single resilient means yieldably resisting movement of said levers upon shifting said handle to its different positions.

4. In a suction cleaner, a body having a nozzle for cleaning a surface, a handle mounted on said body for movement to different positions, nozzle supporting means movably mounted on said body, a first and a second lever mounted on said body, said first lever operatively engaging said nozzle supporting means, first means mounted on said handle for engagement with said first lever means to shift said supporting means and adjust said nozzle upon movement of said handle to one position, second means on said handle for engagement with said second lever to maintain said handle in another position, and single resilient means so arranged with respect to an arm of each of said first and second levers to exert a greater force against shifting of said second lever in effecting movement of said handle from said another position and exerting a lesser force against shifting said first lever in effecting movement of said handle to said one position to adjust said nozzle.

References Cited in the file of this patent

UNITED STATES PATENTS

| | | |
|---|---|---|
| 1,642,518 | Throop | Sept. 13, 1927 |
| 2,070,689 | Smellie | Feb. 16, 1937 |
| 2,174,595 | Pierce | Oct. 3, 1939 |
| 2,178,006 | Taylor | Oct. 31, 1939 |
| 2,225,621 | Burkhardt | Dec. 24, 1940 |
| 2,485,363 | Coss | Oct. 18, 1949 |
| 2,542,120 | Coss | Feb. 20, 1951 |